Sept. 17, 1940.  A. H. MAUDE ET AL  2,214,859
PROCESS FOR PRODUCTION OF HYDROGEN SULPHIDE
Filed Dec. 17, 1938
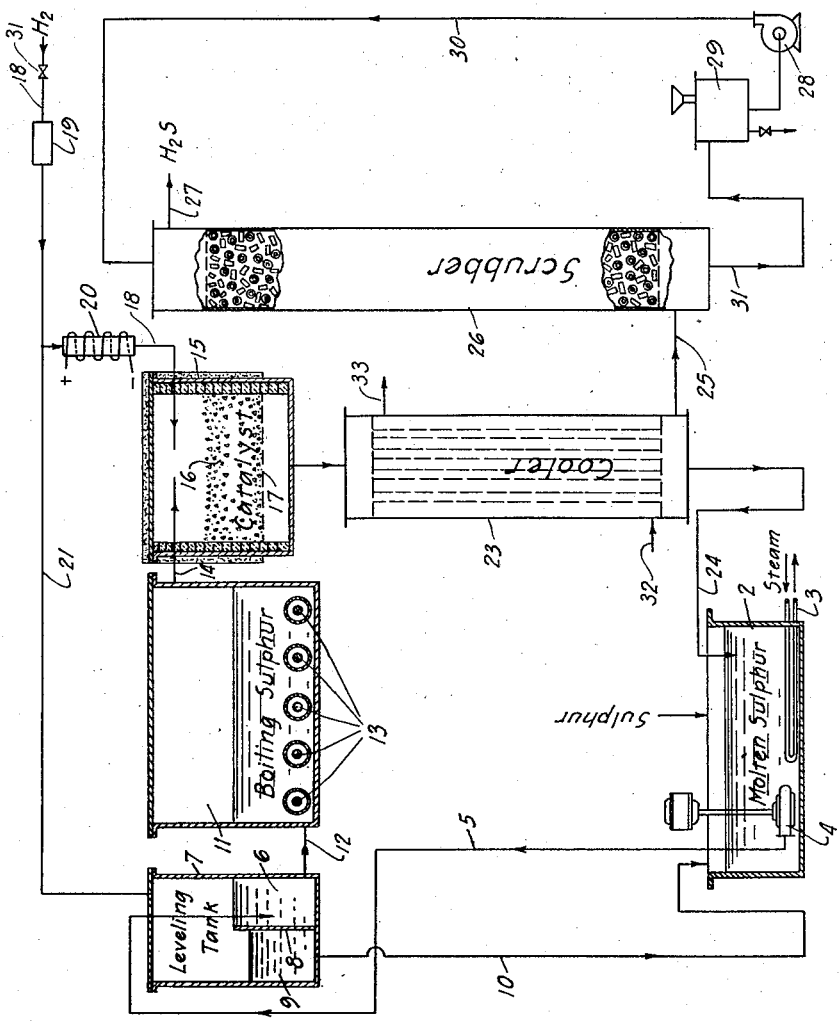
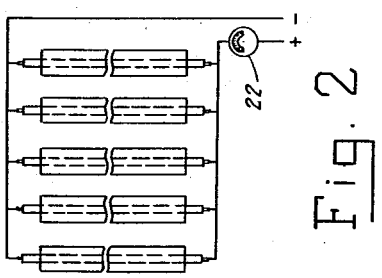
INVENTOR.
Aylmer H. Maude
John D. Sweeney
BY
Kenneth E. Stuart
ATTORNEY.

Patented Sept. 17, 1940

2,214,859

UNITED STATES PATENT OFFICE 2,214,859

PROCESS FOR PRODUCTION OF HYDROGEN SULPHIDE

Aylmer H. Maude and John D. Sweeney, Niagara Falls, N. Y., assignors to Hooker Electrochemical Company, New York, N. Y., a corporation of New York Application December 17, 1938, Serial No. 246,398

10 Claims. (Cl. 23—181)

Heretofore, hydrogen sulphide has been principally obtained as a by-product from petroleum, natural gas and coke ovens.

Hydrogen sulphide can be produced by treating metal sulphides, such as aluminum, lead, zinc and iron sulphide with steam or an acid. It is known that hydrogen will combine with molten sulphur when bubbled through it at 250° to 300° C., under a pressure of five to ten atmospheres. However, a reaction under high pressure, producing, as it does in this case, a more or less toxic and explosive gaseous product, is too hazardous to be commercially practicable. It is also known that hydrogen when bubbled through boiling sulphur will react with it at atmospheric pressure, provided a relatively large contact and refluxing surface, such as a mass of glass wool, be maintained immediately above the sulphur. However, we have not been able to obtain satisfactory yields under these conditions. We have, therefore, sought to avoid the difficulty of carrying on the reaction under elevated pressure, and at the same time to obtain satisfactory yields. We have been able to accomplish these objects by reacting hydrogen with gaseous sulphur, at atmospheric pressure, in presence of a catalyst, out of immediate contact with the liquid sulphur, which permits the gaseous sulphur to become superheated. We have found that hydrogen will react with superheated gaseous sulphur at atmospheric pressure in presence of many metallic oxides and sulphides, also activated carbon, silica and alumina.

Among the catalysts that we have found to be effective are the following, in order of their activity, as determined by the percentage of conversion of hydrogen to hydrogen sulphide, under similar conditions:

| | Per cent of hydrogen converted |
|---|---|
| No catalyst | 11 |
| Glass wool | 14 |
| Vanadium oxide on pumice | 16 |
| Platinized asbestos | 18 |
| Iron sulphide | 20 |
| Silica gel | 35 |
| Alumina gel | 48 |
| Activated carbon | 79 |
| Molybdenum sulphide on alumina gel | 92 |
| Nickel sulphide on alumina gel | 96 |
| Cobalt sulphide on alumina gel | 98 |

It is probable that in many cases the oxides are converted to sulphides during use; therefore, the oxides of the above metals may be considered as the equivalents of their sulphides.

In carrying out the reaction, the mixture of hydrogen and sulphur is produced by bringing together a stream of hydrogen and a stream of gaseous sulphur arising from boiling sulphur. The hydrogen is regulated by a flow meter. The sulphur is electrically heated, the heat input and evolution of vapor being controlled by the aid of a wattmeter. For best yield, the ratio of sulphur to hydrogen should be in substantial excess of one atom of sulphur to two of hydrogen. In fact, for practical purposes, such an excess is essential to the process. It not only results in a better conversion of the hydrogen, but also aids in keeping the temperature of reaction under control, the excess sulphur serving to carry off heat. For practical purposes the atomic ratio of sulphur to hydrogen should be between 2 to 1 and 0.75 to 1. The gaseous mixture is then passed over the catalyst in a separate reaction chamber the upper part of which is preferably heat insulated. In starting the process, the catalyst and reaction chamber are preheated. The reaction being very exothermic, the temperature will tend to rise as the reaction proceeds. For a given rate of flow the eventual temperature will, of course, depend upon the excess of sulphur passing through the reactor, the ratio of the surface of the reactor to its volume, and the extent to which radiation of heat is permitted. For best yield the temperature of reaction should be between 500° and 800° C. As sulphur boils at about 445° C. under atmospheric pressure, the reaction is therefore carried on between hydrogen and superheated gaseous sulphur. We have found it perfectly practicable to control the temperature of reaction by regulating the excess of sulphur and the flow of gases so as to produce the desired temperature, without any external cooling except that due to radiation. This rate of flow will, of course, depend upon the size and design of the reaction chamber. For a given reactor and excess of sulphur, there will obviously be a low limit below which the heat generated will not be sufficient to maintain the temperature and the reaction will cease. There will also be a high limit above which the time of contact with the catalyst will be insufficient. The figures given above to show the relative efficiency of the several catalysts were obtained under optimum conditions for high yield or conversion, namely a space velocity of 250 times the bulk volume of the catalyst per hour, using an atomic ratio of sulphur to hydrogen of about 2 to 1, which is four times the quantity of sulphur that could theoretically combine with the hydrogen. However, these do not necessarily represent the most favorable operating conditions. In practice it is found advantageous to sacrifice yield somewhat for the sake of increased plant output. Thus we find that at a space velocity of 1,000 times the bulk volume of the catalyst we can reduce the atomic ratio of sulphur to hydrogen to 0.8 to 1, with a sacrifice of about 5 per cent in yield. Similarly, with a space velocity of 2,000 times the bulk volume of the catalyst and a ratio of sulphur to hydrogen of 0.8 to 1 we find there is a further sacrifice of about 5 per cent in yield. For practical considerations, we prefer to operate at a space velocity of about 1,400 times the bulk volume of the catalyst. Under these conditions, with a catalyst of cobalt sulphide on a support of alumina gel, we obtain a yield of about 90 per cent.

The product, of course, contains a small percentage of unreacted hydrogen, as well as the excess sulphur. The latter is easily removed by condensation upon cooling. The presence of the hydrogen is unobjectionable.

Several of the above catalysts were tried on carriers of pumice, silica gel and alumina gel, and the latter proved superior. However, alumina gel was found to crumble on long-continued use. To secure the benefit of the superior activity of a combination of cobalt and alumina without the disadvantage of the unsatisfactory mechanical properties of alumina gel, we have tried making up a special catalyst by impregnating lumps of refractory material with a mixture of equal parts of molten aluminum nitrate and cobalt nitrate and igniting the mass. For this purpose we prefer to use crushed refractory material such as diaspore, or "Alfrax," the latter being the trade name of a porous, anhydrous aluminum oxide. This is impregnated with the molten salts until it has taken up all it can hold. Upon ignition the nitrates are converted to oxides. The oxides are later converted to sulphides upon use. The result is a very satisfactory catalyst possessing good mechanical strength and an activity equal or superior to that of cobalt sulphide on a support of alumina gel.

*Example*

Hydrogen at atmospheric pressure was mixed with gaseous sulphur from a body of boiling sulphur. The streams of hydrogen and sulphur vapor were then passed through a separate preheated reaction chamber of chrome steel lined with fire brick which was loosely packed with granular catalytic material consisting of aluminum oxide and cobalt oxide on a support of "Alfrax." The heat input to the sulphur and the flow of hydrogen were regualted so that the volume of gases flowing per hour, measured at ordinary temperature and pressure, was substantially 1,400 times the bulk volume of the catalyst and the ratio of sulphur to hydrogen was substantially 0.8 atom of sulphur to 1 of hydrogen. Under these conditions the temperature in the reaction chamber was found to become stabilized at substantially 650° C. The gases passing from the reaction chamber were cooled to condensate excess sulphur, which was recovered and returned to the process. The residual gases were found to contain hydrogen sulphide corresponding to a conversion of substantially 90 per cent of the original hydrogen.

Referring to the drawing:

Fig. 1 is a flow sheet of our process, a part of the apparatus being shown in section and the piping being shown diagrammatically.

Fig. 2 shows diagrammatically the electrical heating element of Fig. 1 and the electrical connections to the same.

In Fig. 1, 2 is an open tank in which sulphur is melted by means of the steam coil 3. The molten sulphur is raised by pump 4 through pipe 5 to compartment 6 of the closed tank 7. From compartment 6 the molten sulphur flows over baffle 8 to compartment 9, from which it returns by gravity through pipe 10 to tank 2. Compartment 6 is thus kept filled with molten sulphur to the level of the baffle.

From compartment 6 the molten sulphur flows by gravity into closed evaporating tank 11 through pipe 12. Tank 11 is provided with heating means such as electrical resistance element 13. Gaseous sulphur from evaporating tank 11 is conducted through pipe 14 to closed tank 15, which contains a body of catalyst 16, upon support 17. The walls of tank 15 are lined with refractory material. The top is covered externally with heat insulation, as are also the walls, as far down as the catalyst extends. The heat insulation serves to facilitate the building up of a reaction temperature at the start. Below the catalyst it is undesirable, as we find it preferable to allow heat to be radiated from the lower portion of the reaction chamber. Hydrogen controlled by valve 31 from a source of supply not shown is conducted through pipe 18, flow meter 19 and heater 20 to tank 15 above the bed of catalyst, where it mingles with the gaseous sulphur. In order to equalize the pressure in tanks 7, 11 and 15, tanks 7 and 15 are interconnected by means of pipe 21. Since tank 7 is connected by gravity pipe 10 to open tank 2, no pressure can be built up in the system.

The catalyst 16 is preheated by passing through it hydrogen heated by heater 20. While the catalyst is being preheated, the sulphur is being raised to its boiling point by means of the heating element 13. By the time gaseous sulphur begins to come over, the catalyst is hot enough to start the reaction. The inflow of sulphur is determined by the input of electrical energy to the resistance elements 13, and this is regulated by the aid of wattmeter 22 (Fig. 2). The inflow of hydrogen is proportioned to that of the sulphur as indicated in the foregoing description of the process and in the specific example given.

The mixture of gaseous sulphur and hydrogen flows through the bed of hot catalyst and the sulphur and hydrogen combine to form hydrogen sulphide as previously explained. The temperature of the catalyst is controlled by regulating the heat input to the sulphur, and hence the inflow of gaseous sulphur, the supply of hydrogen being of course proportional to the sulphur at all times. Once the catalyst has become stabilized at the desired temperature, no further regulation of sulphur or hydrogen should be required.

From the catalyst tank 15 the mixture of hydrogen sulphide and excess sulphur passes downward through cooler 23. The sulphur thus condensed flows back to tank 2 through pipe 24, which is trapped as shown, to prevent escape of gases. Cooler 23 is preferably of the vertical tubular type. The cooling medium is water under pressure, as the temperature must not be allowed to go below the melting point of the sulphur. It is preferably kept at about 130° C. The cooling water is admitted through pipe 32 and discharged through pipe 33.

The cooled hydrogen sulphide flows through pipe 25 from the bottom of cooler 23 to the bottom of scrubber 26, in which it rises through a body of Raschig rings, countercurrent with respect to a flow of a 20 per cent aqueous solution of sodium hydrosulphide, which dissolves any residual traces of sulphur. The scrubbed hydrogen sulphide passes out of the system to the point of its final disposition through pipe 27. The sodium hydrosulphide solution is circulated by means of pump 28, from reservoir 29, through pipes 30 and 31, the latter being trapped as shown to prevent escape of gases. The body of sodium hydrosulphide solution in circulation is discarded and replenished from time to time.

The tanks 11 and 15 and the upper part of cooler 23 are constructed of high chromium steel (e. g. 17 to 30 per cent chromium). This is important, as ordinary steel will not withstand boiling sulphur or gaseous sulphur or hydrogen sulphide at the temperatures incident to our process. The support for the catalyst is constructed of refractory material, preferably Aloxite which is a trade name for a particular form of refractory porous aluminum oxide largely used as an abrasive.

In order to ensure thorough mixing of the hydrogen and gaseous sulphur above the bed of catalyst, the pipes 14 and 18 are carried through opposite walls of tank 15 and brought to within a few inches of each other. When gases reacting exothermically are passed downward through a bed of catalyst, local heating of the catalyst at a point of concentrated flow would oppose flow at that point and tend to divert the flow elsewhere. Hence, the flow tends to become equalized over the entire bed of catalyst. This makes it possible to use a bed of catalyst having a depth less than its length and breadth. Such a bed of catalyst obviously offers less resistance to flow than if the depth were greater and the area less.

It will be observed that since the reaction takes place out of contact with the boiling liquid sulphur, the sulphur becomes heated above its boiling point. Thus, sulphur boils at 445° C. at atmospheric pressure, whereas our reaction takes place at 500° to 800° C. In other words, the reaction takes place between hydrogen and superheated gaseous sulphur.

Hydrogen sulphide is a useful reagent for the preparation of metallic sulphides and hydrosulphides. Alkali metal sulphides are largely used in the rayon, leather and dye industries. Heavy metal sulphides are useful as pigments.

We claim as our invention:

1. The process for production of hydrogen sulphide by reaction of sulphur with hydrogen with a high yield and rate of production thereof, which comprises boiling sulphur by heat extraneous to the reaction, metering the rate of evolution of sulphur vapor, mixing said sulphur vapor with a metered flow of substantially undiluted hydrogen, supplying heat to maintain the mixture above its saturation temperature, passing said mixture in contact with catalytic material out of heat transfer relation with the boiling sulphur and containing at least one compound of the group consisting of the oxides and sulphides of cobalt, nickel and molybdenum, regulating the evolution of sulphur vapor and flow of hydrogen to produce a mixture composed of 2 to 0.75 atoms of sulphur per atom of hydrogen while co-ordinating the space velocity of said mixture with its composition and maintaining the limits of space velocity corresponding to said limits of composition at 250 to 2,000 times the bulk volume of said catalyst per hour respectively, and regulating said space velocity to maintain said catalyst between 500° and 800° C.

2. The process for production of hydrogen sulphide by reaction of sulphur with hydrogen with a high yield and rate of production thereof, which comprises supplying heat to boil sulphur, metering the heat input as a measure of the rate of evolution of sulphur vapor, mixing said sulphur vapor with a metered flow of substantially undiluted hydrogen, supplying heat to maintain the mixture above its saturation temperature, passing said mixture in contact with catalytic material out of heat transfer relation with the boiling sulphur and containing at least one compound of the group consisting of the oxides and sulphides of cobalt, nickel and molybdenum, regulating the evolution of sulphur vapor and flow of hydrogen to produce a mixture composed of 2 to 0.75 atoms of sulphur per atom of hydrogen while co-ordinating the space velocity of said mixture with its composition and maintaining the limits of space velocity corresponding to said limits of composition at 250 to 2,000 times the bulk volume of said catalyst per hour respectively, and regulating said space velocity to maintain said catalyst between 500° and 800° C.

3. The process for production of hydrogen sulphide by reaction of sulphur with hydrogen with a high yield and rate of production thereof, which comprises supplying electrically generated heat to boil sulphur, metering the input of electrical energy as a measure of the rate of evolution of sulphur vapor, mixing said sulphur vapor with a metered flow of substantially undiluted hydrogen, supplying heat to maintain the mixture above its saturation temperature, passing said mixture in contact with catalytic material out of heat transfer relation with the boiling sulphur and containing at least one compound of the group consisting of the oxides and sulphides of cobalt, nickel and molybdenum, regulating the evolution of sulphur vapor and flow of hydrogen to produce a mixture composed of 2 to 0.75 atoms of sulphur per atom of hydrogen while co-ordinating the space velocity of said mixture with its composition and maintaining the limits of space velocity corresponding to said limits of composition at 250 to 2,000 times the bulk volume of said catalyst per hour respectively, and regulating said space velocity to maintain said catalyst between 500° and 800° C.

4. The process for production of hydrogen sulphide by reaction of sulphur with hydrogen with a high yield and rate of production thereof which comprises boiling sulphur, metering the rate of evolution of sulphur vapor, conducting said sulphur vapor to a reaction chamber containing catalytic material including at least one compound of the group consisting of the oxides and sulphides of cobalt, nickel and molybdenum, and positioned to prevent impairment and cooling of said catalyst by spatter from and conduction of heat to the boiling sulphur, introducing directly into said chamber a metered flow of substantially undiluted hydrogen, supplying heat to maintain the resulting mixture above its saturation temperature, passing said mixture in contact with said catalyst and regulating the evolution of sulphur vapor and flow of hydrogen to produce a mixture composed of 2 to 0.75 atoms of sulphur per atom of hydrogen and to coordinate the space velocity of said mixture with its composition, while maintaining the limits of space velocity corresponding to said limits of composition at 250 to 2,000 times the bulk volume of said catalyst per hour respectively, and regulating said space velocity to maintain said catalyst between 500° and 800° C.

5. The process for production of hydrogen sulphide with a high rate of production thereof and a yield above 80 percent, based on the hydrogen, which comprises boiling sulphur, metering the rate of evolution of sulphur vapor, conducting said vapor to a reaction chamber containing catalytic material including at least one compound of the group consisting of the oxides and sulphides of cobalt, nickel and molybdenum on a refractory support, said chamber positioned to prevent impairment or cooling of said catalyst by spatter from and conduction of heat to the boiling sulphur, introducing directly into said chamber substantially undiluted hydrogen preheated to maintain the resulting mixture above its saturation temperature, passing said mixture in contact with said catalyst, regulating the evolution of sulphur vapor and flow of hydrogen to produce a mixture composed of 2 to 0.75 atoms of sulphur per atom of hydrogen while coordinating the space velocity of said mixture with its composition and maintaining the limits of space velocity corresponding to said limits of composition at 250 to 2,000 times the bulk volume of said catalyst per hour respectively, and regulating said space velocity to maintain said catalyst between 500° and 800° C.

6. The process for production of hydrogen sulphide with a high rate of production thereof and a yield above 95 percent, based on the hydrogen, which comprises boiling sulphur, metering the rate of evolution of sulphur vapor, conducting said vapor to a reaction chamber containing cobalt oxide on a refractory support of alumina, said chamber positioned to prevent impairment or cooling of said catalyst by spatter from and conduction of heat to the boiling sulphur, introducing directly into said chamber substantially undiluted hydrogen preheated to maintain the resulting mixture above its saturation temperature, pressing said mixture in contact with said catalyst, regulating the evolution of sulphur vapor and flow of hydrogen to produce a mixture composed of substantially 2 atoms of sulphur per atom of hydrogen, while maintaining the space velocity of said mixture at substantially 250 times the bulk volume of said catalyst per hour, to maintain said catalyst at substantially 500° C.

7. The process for production of hydrogen sulphide with a high rate of production thereof and a yield above 90 percent, based on the hydrogen, which comprises boiling sulphur, metering the rate of evolution of sulphur vapor, conducting said vapor to a reaction chamber containing cobalt oxide on a refractory support of alumina, said chamber positioned to prevent impairment or cooling of said catalyst by spatter from and conduction of heat to the boiling sulphur, introducing directly into said chamber substantially undiluted hydrogen preheated to maintain the resulting mixture above its saturation temperature, passing said mixture in contact with said catalyst, regulating the evolution of sulphur vapor and flow of hydrogen to produce a mixture of substantially 0.8 atom of sulphur per atom of hydrogen, while maintaining the space velocity of said mixture at substantially 1,000 times the bulk volume of said catalyst per hour, to maintain said catalyst at substantially above 500° C.

8. The process for production of hydrogen sulphide with a high rate of production thereof and a yield above 87 percent, based on the hydrogen, which comprises boiling sulphur, metering the rate of evolution of sulphur vapor, conducting said vapor to a reaction chamber containing cobalt oxide on a refractory support of alumina, said chamber positioned to prevent impairment or cooling of said catalyst by spatter from and conduction of heat to the boiling sulphur, introducing directly into said chamber substantially undiluted hydrogen preheated to maintain the resulting mixture above its saturation temperature, passing said mixture in contact with said catalyst, regulating the evolution of sulphur vapor and flow of hydrogen to produce a mixture composed of substantially 0.8 atom of sulphur per atom of hydrogen, while maintaining the space velocity of said mixture at substantially 1,400 times the bulk volume of said catalyst per hour, to maintain said catalyst at substantially 650° C.

9. The process for production of hydrogen sulphide with a high rate of production thereof and a yield above 85 percent, based on the hydrogen, which comprises boiling sulphur, metering the rate of evolution of sulphur vapor, conducting said vapor to a reaction chamber containing cobalt oxide on a refractory support of alumina, said chamber positioned to prevent impairment or cooling of said catalyst by spatter from and conduction of heat to the boiling sulphur, introducing directly into said chamber substantially undiluted hydrogen preheated to maintain the resulting mixture above its saturation temperature, passing said mixture in contact with said catalyst, regulating the evolution of sulphur vapor and flow of hydrogen to produce a mixture composed of substantially 0.75 atom of sulphur per atom of hydrogen, while maintaining the space velocity of said mixture at substantially 2,000 times the bulk volume of said catalyst per hour, to maintain said catalyst at substantially 800° C.

10. The process for production of hydrogen sulphide by reaction of sulphur with hydrogen with a high yield and rate of production thereof which comprises boiling sulphur by heat extraneous to the reaction, metering the rate of evolution of sulphur vapor, mixing said sulphur vapor with a metered flow of hydrogen, supplying heat to maintain the mixture above its saturation temperature, passing said mixture in contact with catalyst for reaction of sulphur with hydrogen out of heat transfer relation with the boiling sulphur, regulating the evolution of sulphur vapor and flow of hydrogen to co-ordinate the composition of the mixture with the space velocity of the mixture relative to the bulk volume of the catalyst per unit of time and produce a mixture of optimum composition with respect to said space velocity and regulating the composition and space velocity of the mixture to maintain said catalyst between 500° and 800° C.

AYLMER H. MAUDE.
JOHN D. SWEENEY.